(12) United States Patent
Schuster et al.

(10) Patent No.: US 6,982,512 B2
(45) Date of Patent: Jan. 3, 2006

(54) INTERFERENCE-SUPPRESSED UNIVERSAL MOTOR

(75) Inventors: Hermann Schuster, Geltendorf (DE); Michael Reiner, Untermeitingen (DE); Josef Hunger, Olching (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/053,406

(22) Filed: Feb. 8, 2005

(65) Prior Publication Data

US 2005/0174005 A1    Aug. 11, 2005

(30) Foreign Application Priority Data

Feb. 9, 2004    (DE) ...................... 10 2004 006 208

(51) Int. Cl.
*H02K 11/02* (2006.01)
(52) U.S. Cl. ...................................... 310/148; 310/149
(58) Field of Classification Search ........ 310/248–253, 310/135, 141, 142, 148, 149
See application file for complete search history.

(56) References Cited

U.S. PATENT DOCUMENTS

| | | | | |
|---|---|---|---|---|
| 2,800,598 | A | * | 7/1957 | Whitcroft .................... 310/220 |
| 4,384,223 | A | * | 5/1983 | Zelt ........................ 310/68 R |
| 5,306,974 | A | * | 4/1994 | Bates ....................... 310/68 R |
| 6,037,693 | A | * | 3/2000 | Marth et al. ................ 310/220 |
| 6,580,194 | B2 | * | 6/2003 | Mizutani et al. ............ 310/239 |
| 6,700,289 | B2 | * | 3/2004 | Konishi et al. ............. 310/220 |

* cited by examiner

*Primary Examiner*—Darren Schuberg
*Assistant Examiner*—Heba Elkassabgi
(74) *Attorney, Agent, or Firm*—Abelman, Frayne & Schwab

(57) ABSTRACT

A universal motor having two carbon brushes (2a, 2b) and two series connected field coils (4a, 4b). The universal motor having an interference suppressing capacitor (5) with a first terminal (6a) connected directly to the first carbon brush (2a) and connected with a field coil (4a) in a conducting manner. The interference suppressing capacitor (5) also including a second terminal (6b) connected directly to the second carbon brush (2b) and connected to a power line (8b) in a conducting manner.

6 Claims, 1 Drawing Sheet

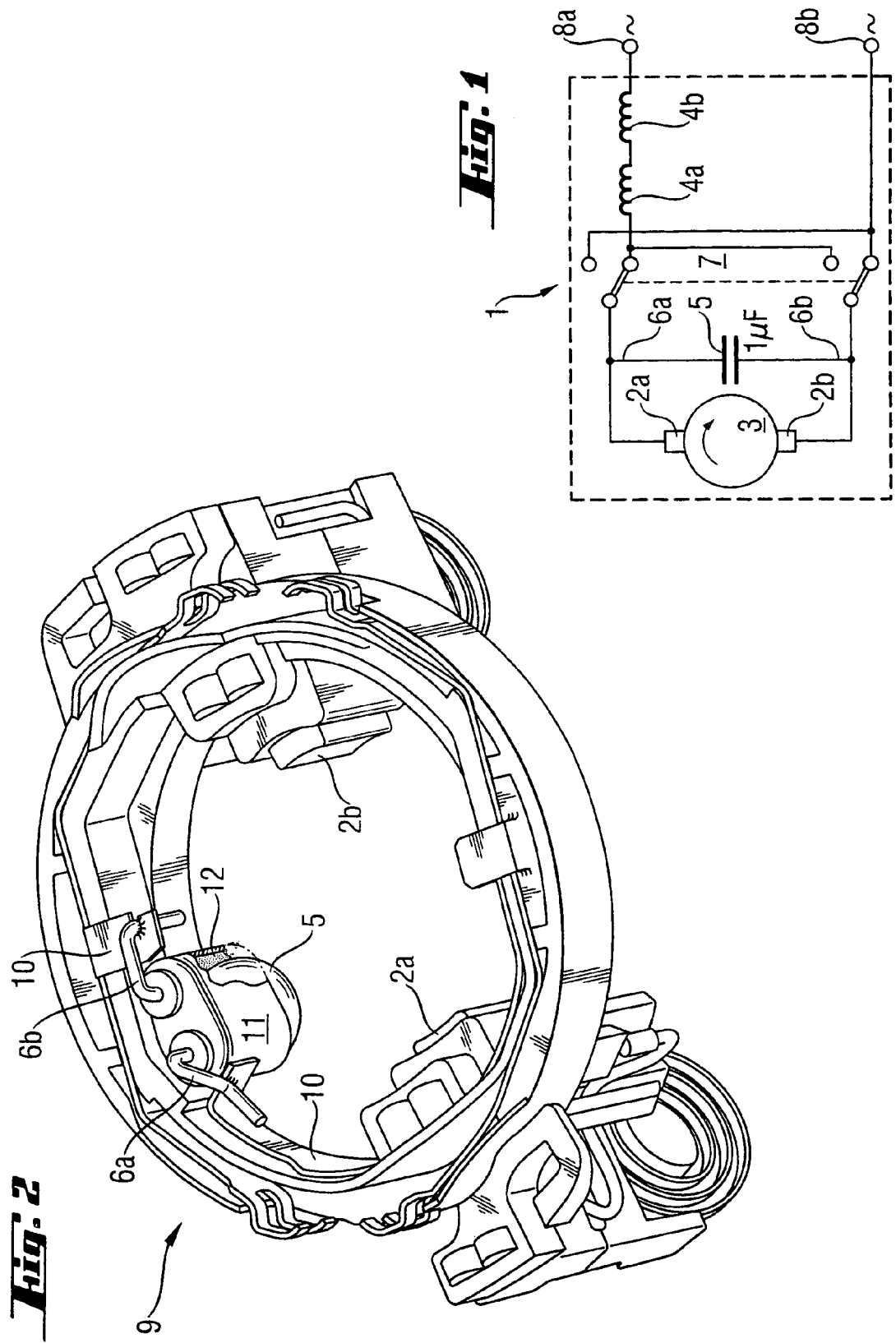

INTERFERENCE-SUPPRESSED UNIVERSAL MOTOR

BACKGROUND OF THE INVENTION

The invention relates to an interference suppressed universal motor, preferably for electrical hand tool machines.

Electrical hand tool machines require compact high-performance universal motors for driving the tool. The power supply in mains-supplied electrical hand tool machines is provided via a power cable. A commutator swivel switch with a rotationally pivotable brush mounting plate is provided for switching the rotational direction of the universal motor.

An interference suppressing capacitor is usually used on the power cable side for suppressing transfer to the power cable of higher-frequency brush sparking occurring at the carbon brushes. The interference suppressing capacitor forms a low-pass with a brush-side field coil for each power line.

According to U.S. Pat. No. 6,037,693, an interference suppressed universal motor has an interference suppressing capacitor on the power cable side, which forms a low-pass with a brush-side field coil on each power line. The symmetrical arrangement of the two field coils on each of the two carbon brushes is disadvantageous in compact universal motors for electrical hand tool machines.

According to EP 9 248 48 A2, a thyristor controlled universal motor of a mains powered electrical hand tool machine has two directly series-connected field coils. In motor operation, a carbon brush is connected directly with a power line, whereby high-frequency interference signals can propagate undamped over the power cable.

SUMMARY OF THE INVENTION

The object of the invention is to provide an interference-suppressed, compact universal motor with two directly series-connected field coils.

This object is achieved in accordance with the invention by a circuit topology of a universal motor with two carbon brushes and two directly series-connected field coils having an interference-suppressing capacitor, whose first terminal is connected directly with a first carbon brush and conducts with a field coil and whose second terminal is connected to the second carbon brush and conducts with a power line.

The higher frequency brush sparking is damped directly at the point of origin due to the interference suppressing capacitor wired directly via the carbon brushes. The higher frequency brush sparking diminishes by the resistance in each carbon brush that forms a RC-low pass with the interference suppressing capacitors.

Advantageously, the interference suppressing capacitor has a capacitance of greater than 220 pF, whereby the critical frequency of the RC low pass is sufficiently low to pick up all interference components in the frequency spectrum.

Advantageously, the interference suppressing capacitor is configured as a low inductance capacitor. Further advantageously, the interference suppressing capacitor is configured as a tantalum or ceramic capacitor, whereby high frequency interference can also be reliably bypassed.

Advantageously, the interference suppressing capacitor is arranged on the brush mounting plate, whereby a short connection length with the lowest possible inductance is realized to the carbon brushes.

Advantageously, the interference suppressing capacitor is connected directly to a conducting punched grid of a commutator pivot switch arranged on the brush mounting plate, for reversing control. Further advantageously, the interference-suppressing capacitor are soldered to the conducting punched grid, whereby a contact with the lowest possible inductance is realized.

Advantageously, the interference suppressing capacitor is vibration resistant arranged in an associated pocket-like recess of the brush mounting plate; further advantageously the interference suppressing capacitor is cast in a cast mass, whereby mechanical fatigue of the interference suppressing capacitor is prevented, particularly in the a vibrating electrical hand tool machine.

BRIEF DESCRIPTION OF THE DRAWINGS

The exemplary embodiment of the invention will be explained in more detail with reference to the drawings, wherein:

FIG. 1 shows the circuit topography of a universal motor in accordance with the invention; and FIG. 2 shows a brush mounting board in accordance with the invention.

DETAILED DESCRIPTION OF THE INVENTION

FIG. 1 shows a circuit topography of a universal motor 1, in accordance with the invention, with two carbon brushes 2a, 2b having an interference suppressing capacitor 5 with a capacitance of 1 nF for supplying current to an armature 3 and two directly series connected field coils 4a, 4b. The first terminal 6a of the interference suppressing capacitor 5 is connected directly to the first carbon brush 2a and via a commutator pivot switch 7 to the first field coil 4a, in a conducting manner. The second field coil 4b is connected directly with a first mains frequency power line 8a. The second terminal 6b is connected directly to the second carbon brush 2b and via the commutator pivot switch 7 to a second power line 8b, in a conducting manner.

FIG. 2 shows the interference suppressing capacitor 5 configured as a lens-shaped low-inductance ceramic capacitor arranged directly on the brush mounting plate 9 with the carbon brushes 2a, 2b. The terminals 6a, 6b of the interference suppressing capacitor 5 are soldered directly to a punched grid 10 of the commutator pivot switch 7 arranged on the brush mounting plate 9. The interference-suppressing capacitor 5 is arranged vibration resistant in an associated, pocket-like recess 11 of the brush mounting plate 9 and cast in a filler mass 12.

What is claimed is:

1. A universal motor having two carbon brushes (2a, 2b) and two series connected field coils (4a, 4b), comprising an interference suppressing capacitor (5) including a first terminal (6a) connected directly to the first carbon brush (2a) and with a field coil (4a) in a conducting manner and including a second terminal (6b) connected directly to the second carbon brush (2b) and to a power line (8b) in a conducting manner, wherein the interference suppressing capacitor (5) is arranged on a brush mounting plate (9), and wherein the terminals (6a, 6b) of the interference suppressing capacitor (5) are connected to a current carrying punched grid (10) of a commutator pivot switch (7) arranged on the brush mounting plate (9).

2. The universal motor of claim 1, wherein the interference suppressing capacitor (5) has a capacitance of greater than 220 pF.

3. The universal motor of claims 1, wherein the interference suppressing capacitor (5) is a low inductance capacitor.

4. The universal motor of claim 1, wherein the interference suppressing capacitor (5) is vibration resistant arranged in an associated pocket-like recess (11) of the brush mounting plate (9).

5. The universal motor of claim 4, wherein the interference suppressing capacitor (5) is sealed in a filler compound mass (12).

6. The universal motor of claim 1, wherein the terminals (6a, 6b) of the interference suppressing capacitor (5) are soldered direction to the current carrying punched grid (10).

* * * * *